UNITED STATES PATENT OFFICE.

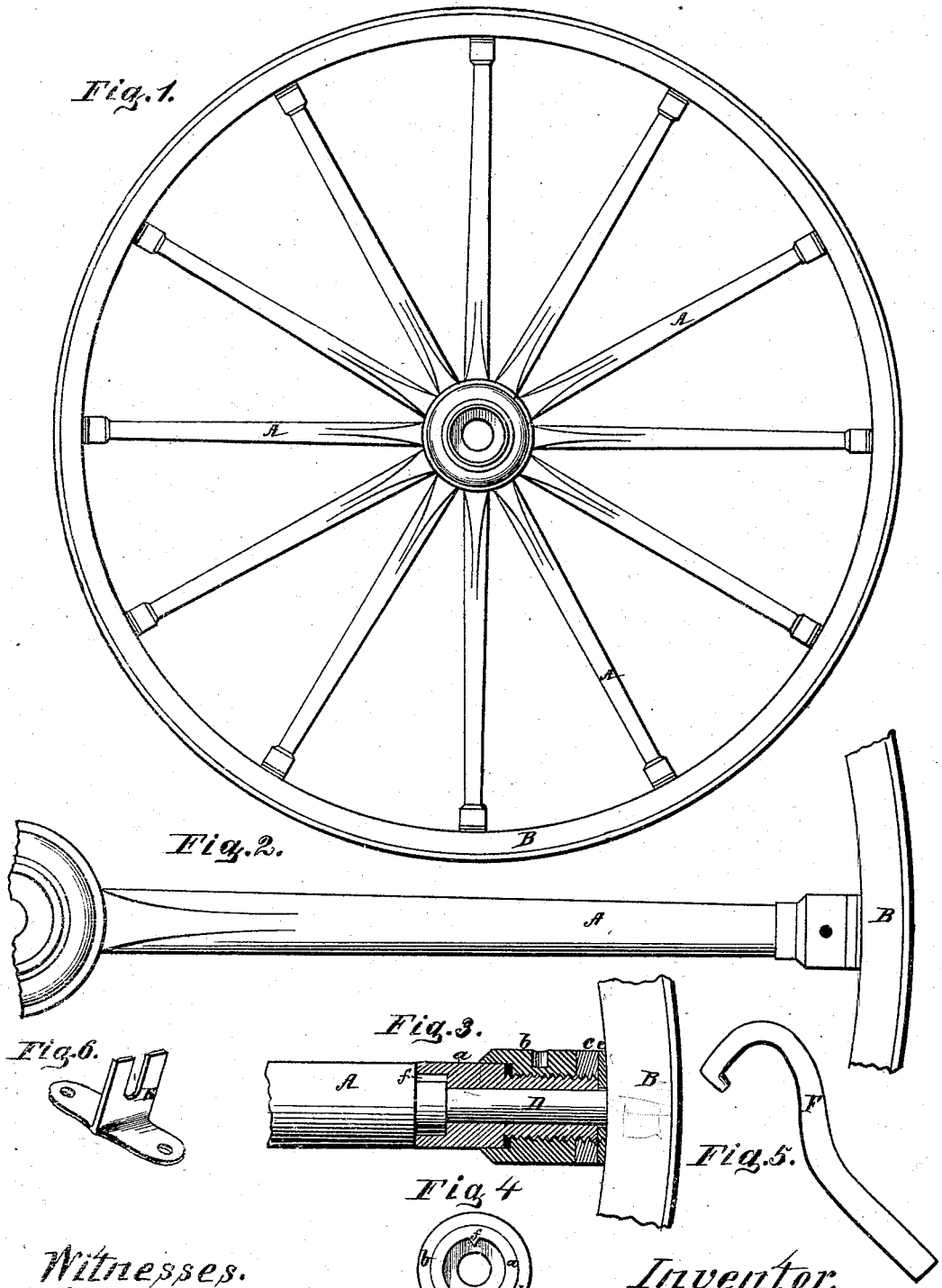

MICHAEL B. WHITE, OF McLEAN COUNTY, ILLINOIS.

IMPROVEMENT IN WHEELS FOR VEHICLES.

Specification forming part of Letters Patent No. 143,481, dated October 7, 1873; application filed December 26, 1872.

*To all whom it may concern:*

Be it known that I, M. B. WHITE, of the county of McLean and State of Illinois, have invented a new and Improved Wagon-Wheel; and I do hereby declare that the following is a full, clear, and exact description of the same, reference being had to the accompanying drawing forming a part of this specification, in which—

Figure 1 is a side elevation of a wheel embodying my invention. Fig. 2 is a side view of a spoke detached from the wheel, but connected with sections of the hub and felly. Fig. 3 is a cross-section of the adjusting device, consisting of a thimble and nuts, applied to a spoke-tenon according to my invention. Fig. 4 is an end view of the nut and thimble. Fig. 5 represents a wrench for turning the adjusting-nut, and Fig. 6 is a perspective view of a wedge-plate for tightening the fellies.

My invention is an improvement in devices applied to spokes of wagon-wheels for the purpose of tightening them, or enabling the fellies to be expanded when necessary.

The construction and arrangement of parts are hereinafter described.

In the drawing, the spoke A is shown provided with a round, shouldered tenon, D, which enters a hole or mortise in the felly B. The thimble $a$, fitting on said tenon, is reduced and screw-threaded for one-half its length, and on such reduced portion the nut $b$ is screwed, as also the jam-nut $c$. The thimble is applied to the spoke-tenon with its upper or larger end abutting against the shoulder thereof, and has projections or ribs $f$, which take into notches or engage with corresponding projections on the spoke, for the purpose of preventing the thimble from turning. The jam-nut $c$ rests on a metallic washer, $e$. The larger nut, $b$, has recesses in its exterior surface, to adapt it for application of the wrench F for turning the same. The upper end of said nut is recessed to adapt it to receive the thimble $b$, or, in other words, to form a circular flange which excludes dust from the screw and strengthens the connection between the thimble and nut.

When the tire requires to be tightened, or the felly adjusted for other reason, the wrench F is applied to the nut $b$, and it is turned or screwed back toward the felly until the distance between the spoke-shoulder and the felly has been sufficiently increased to produce the desired effect.

I show, in Fig. 6, a device, E, consisting of a T-shaped plate, whose notched arm is designed to fit between the adjacent ends of two fellies which have spread apart, or require to be so spread; and in such case the notched arm straddles the felly-tenon, and the other arms fit against the inner side of the fellies and are secured by screws or analogous devices.

I am aware nuts and thimbles, or equivalent devices, have been previously employed for adjusting spokes and fellies with relation to each other, and do not, therefore, claim them as of my invention. I also disclaim the use of wedges for tightening fellies.

Having thus described my invention, what I claim as new, and desire to secure by Letters Patent, is—

1. The adjusting-nut $b$ and jam-nut $c$, in combination with the thimble $a$, having a reduced screw-threaded portion, and the projections $f$ for engaging the spoke-shoulder, as shown and described.

2. The T-shaped device E, having one of its arms notched to fit between the abutting ends of the fellies and the others perforated to receive screws, whereby it is secured to said fellies, as shown and described.

MICHAEL B. WHITE.

Witnesses:
THOS. SLADE,
ISAAC C. HEWARD.